US005601899A

United States Patent [19]
Campbell

[11] Patent Number: 5,601,899
[45] Date of Patent: Feb. 11, 1997

[54] SHEET WITH INTEGRAL FASTENER

[75] Inventor: Michael T. Campbell, Grand Rapids, Mich.

[73] Assignee: Cascade Engineering, Inc., Grand Rapids, Mich.

[21] Appl. No.: 405,732

[22] Filed: Mar. 17, 1995

[51] Int. Cl.$^6$ ....................................... B32B 3/06
[52] U.S. Cl. .................. 428/99; 24/297; 24/324; 52/741.1; 52/745.06; 428/131; 428/134; 428/136; 428/156; 428/192; 428/220
[58] Field of Search ........................... 428/99, 131, 134, 428/136, 156, 192, 220; 52/741.1, 745.06, 202; 24/297, 324

[56] References Cited

U.S. PATENT DOCUMENTS

| | | | |
|---|---|---|---|
| 1,197,906 | 9/1916 | Buzzard | 24/324 |
| 1,871,571 | 8/1932 | Weber | 428/99 |
| 2,358,206 | 9/1944 | Boersma | 24/297 |
| 4,874,276 | 10/1989 | Iguchi | 411/48 |
| 5,014,369 | 5/1991 | Daus | 24/324 |
| 5,195,793 | 3/1993 | Maki | 24/297 |
| 5,291,639 | 3/1994 | Baum et al. | 24/297 |

*Primary Examiner*—Nasser Ahmad
*Attorney, Agent, or Firm*—Varnum, Riddering, Schmidt & Howlett LLP

[57] ABSTRACT

An integral fastener particularly for use in mounting a sheet material to a structural member with a plurality of threaded studs. The integral fastener in one embodiment is connected to the sheet by a web adjacent an aperture in the sheet. The fastener has an opening that defines multiple flaps. To fasten the sheet material to the stud, the stud is inserted through the sheet aperture and the fastener is pressed on the stud so that it extends through the fastener opening, deflecting the flaps, which engage the threads of the stud. In another embodiment, the fastener is formed within the sheet and defines an opening through which the stud passes. In a third embodiment, the stud comprises a T-shaped flange and the fastener has a slotted opening at an acute angle to the plane of the T-shaped flange to retain the fastener on the T-shaped flange.

28 Claims, 3 Drawing Sheets

SHEET WITH INTEGRAL FASTENER

BACKGROUND OF THE INVENTION

1. Field of the Invention

The invention relates to sheet material with integral fasteners for securing the sheet material to a structural member. In one of its aspects, the invention relates to a sound barrier mat having an integral fastener for securing the mat to a vehicle fire wall. In another of its aspects, the invention relates to a method for assembling a sheet material to a structural wall. In still another of its aspects, the invention relates to a structural wall assembly comprising a structural wall and a sheet material fastened thereto.

2. Description of Related Art

In most contemporary automobiles, a steel fire wall separates the engine compartment from the passenger compartment. To reduce the transmission of sound from the engine compartment through the fire wall and into the passenger compartment, a sound barrier mat is mounted to and substantially overlies the fire wall.

The sound barrier mat is mounted to a plurality of studs extending from the surface of the fire wall. Typically, to mount the sound barrier mat to the fire wall, the sound barrier mat has corresponding apertures in register with the studs so that the studs extend through the apertures and hang the sound barrier mat on the fire wall.

An absorber mat is usually attached to the sound barrier mat. When the sound barrier mat is installed to the fire wall, the absorber mat reduces the area of contact between the sound barrier mat and the fire wall. The sound barrier mat will lay under the carpet and extends beyond the carpet up to the top of the fire wall. To secure the sound barrier mat to the fire wall, separate fasteners are mounted onto the studs. The fasteners prevent the accidental removal or repositioning of the sound barrier mat and the underlying absorber mat.

A fastener for attaching an article such as a trim strip to a motor vehicle body is disclosed in U.S. Pat. No. 5,291,6392 Baum et al., issued Mar. 8, 1994. The Baum fastener is a plastic, push-button fastener which consists of a domed head with a circular stem that is received at one end in a circular skirt. A pair of resilient fingers project into an axial bore of the stem. To attach the fastener to the vehicle, a threaded stud mounted to the car body is received within the axial bore of the stem. By exerting pressure on the push-button, the stem is pressed over and onto the stud to deflect the retaining fingers so that they engage the threads on the stud to secure the fastener to the body panel. The domed head abuts the trim strip to hold the trim strip to the vehicle body.

Other similar fasteners are disclosed in U.S. Pat. Nos. 4,874,276, issued Oct. 17, 1989; 5,014,369, issued May 14, 1991; 5,195,793, issued Mar. 23, 1993; and 1,197,906, issued Sep. 12, 1916.

SUMMARY OF INVENTION

According to the invention, a sheet material for mounting on a wall with a stud extending from the wall has a fastener integrally formed with the sheet material and an opening therethrough adapted to receive the stud and be retained securely thereon. The fastener has a protrusion with the opening at a central portion of the protrusion. In one embodiment, the protrusion has a hemispheric shape. In another embodiment, the protrusion has a conical shape.

Preferably, the fastener opening is slotted and defines multiple flaps which can be deformed as the stud is pushed through the fastener opening. Typically, the stud is threaded and the flaps engage the threads of the stud to securely mount the protrusion to the stud. Preferably, the portion of the dome forming the flaps is greater in thickness than the rest of the protrusion to stiffen the flaps. The protrusion preferably has a hollow interior.

In one embodiment, the fastener is spaced from the sheet by a flexible web so that the fastener can be rotated to a position overlying the sheet. In another embodiment, the fastener is integrally formed within the sheet and receives the stud as the sheet is mounted onto the wall.

The invention also contemplates a structural wall assembly comprising a structural wall having at least one stud projecting thereof and a sheet material as described above is mounted to the structural wall.

In one embodiment, the stud is threaded and the fastener engages the threads of the stud. In another embodiment, the stud comprises a T-shaped flange and the fastener has a slot at an acute angle to the plane of the fastener.

Further, according to the invention, a method of assembling a sheet material with at least one aperture to a structural wall having at least one stud extending therefrom comprises the steps of integrally forming a fastener with the sheet material, the fastener having an opening for receiving the at least one stud, mounting the sheet material to the structural wall by aligning the at least one aperture with the at least one stud and moving the sheet material toward the structural wall to insert the at least one stud through the at least one aperture. The sheet material is then secured to the structural wall by aligning the fastener opening with the at least one stud and moving the fastener toward the structural wall to insert the at least one stud through the fastener opening. Preferably, the sheet material is injection molded.

The invention provides for quick and inexpensive assembly of a sheet material, such as an absorber mat to a structural wall such as a fire wall in an automobile. The invention eliminates the need for separate fasteners which must be secured to the stud after the sheet is mounted to the wall. The integral nature of the fasteners results in a more cost effective way of mounting a sheet material to a wall.

BRIEF DESCRIPTION OF THE DRAWINGS

The invention will now be described with reference to the drawings wherein.

DESCRIPTION OF THE PREFERRED EMBODIMENTS

Figure 1:
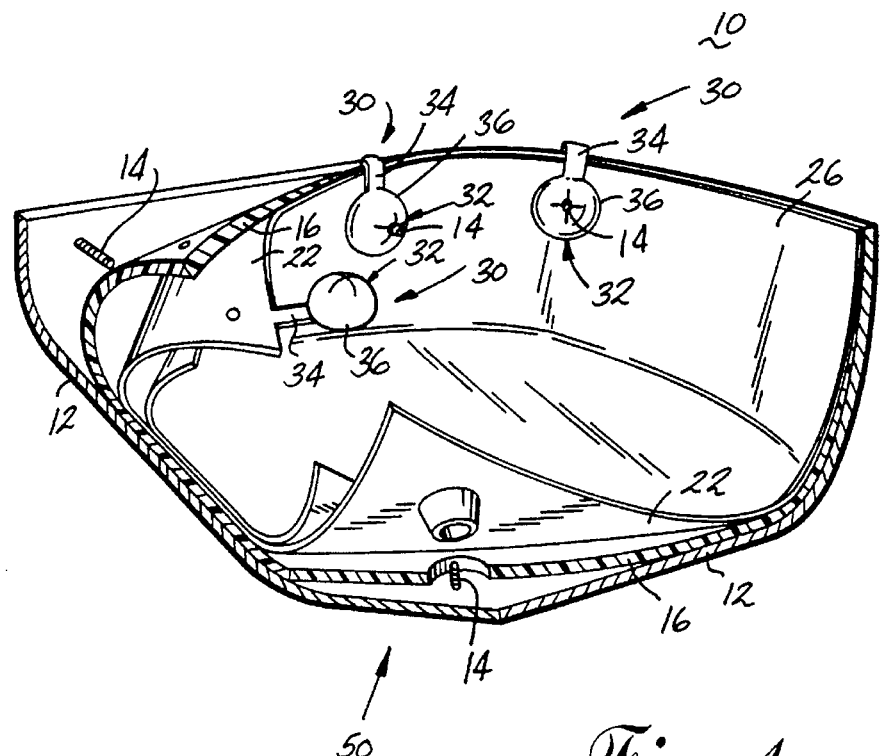
FIG. 1 is a perspective view of a vehicle sound barrier mat incorporating the integral fastener according to the invention.

FIG. 1 illustrates a typical fire wall assembly 10 incorporating the integral or unitary fastener 30 according to the invention. The fire wall assembly 10 comprises a fire wall 12, which separates the engine compartment from the passenger compartment of an automobile. The fire wall 12 is generally made of steel and has a plurality of threaded studs 14 extending therefrom. The studs 14 are most often placed about the periphery of the fire wall 12; however, depending on the application, the studs 14 can be positioned within the interior of the fire wall 12.

The fire wall 12 is substantially covered by an absorber mat 16, which has a plurality of apertures 18 corresponding to and in register with the studs 14. The absorber mat 16 is oriented with respect to the fire wall 12 so that the apertures 18 align with the studs 14. When the absorber mat 16 is placed against the fire wall 12, the studs 14 extend through the apertures 18 and the absorber mat 16 is suspended from the studs 14.

A sound barrier mat 22, preferably made of thermoplastic olefin, overlies the absorber mat and separates the absorber mat 16 from a layer of carpet 24, which faces the passenger compartment. The sound barrier mat 22, like the absorber mat 16, has a plurality of apertures 26 through the studs 14 extend to hang or suspend the sound barrier mat 22 from the fire wall 12. The sound barrier mat 22 has a number of integral fasteners 30, each of which is associated with a sound barrier mat aperture 26.

Figure 2:
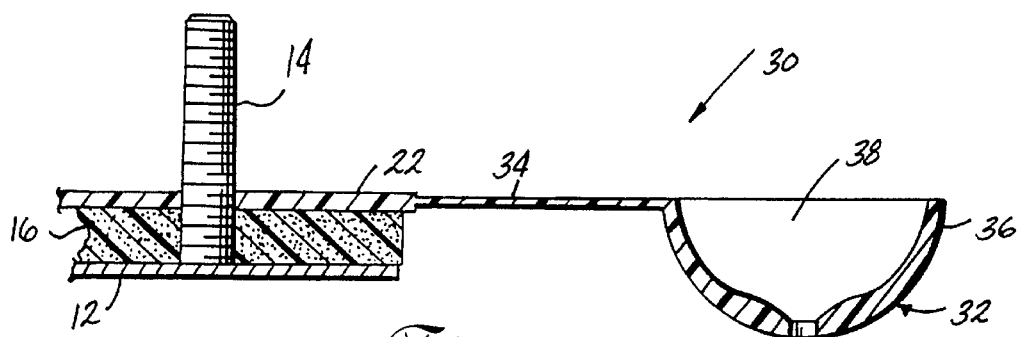
FIG. 2 is a sectional view of a fastener illustrated in the disassembled condition.
Figure 3:
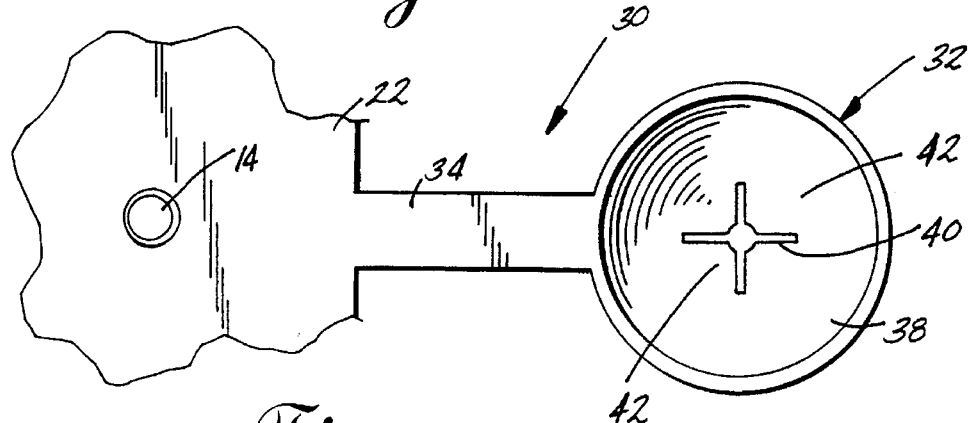
FIG. 3 is a plan view of the first embodiment of the integral fastener illustrated in FIG. 2 in the disassembled condition.
Figure 4:
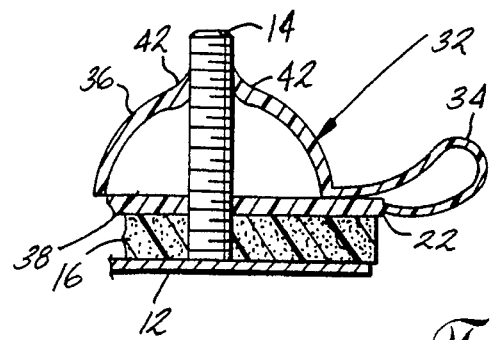
FIG. 4 is an elevational view in section of the integral fastener of FIG. 2 in the fastened position.

Referring to FIGS. 2 through 4, the integral fastener 30 comprises a fastener or cap 32 connected to the sound barrier mat 22 by a web 34. The cap 32 and web 34 are an integral part of the sound barrier mat 22 and are preferably injection molded as a single part.

In its preferred form, the cap 32 is a hollow hemispherical dome 36 having a circular, open bottom 38 and a cross-shaped aperture 40 at the top of the dome 36. The cross-shaped aperture 40 defines multiple flaps 42 in the surface of the dome 36 and which are flexible with respect to the dome 36. The thickness of the dome 36 is substantially uniform, except that the portion of the dome 36 surrounding and including the flaps 42 can have a greater thickness to give the flaps more rigidity. The diameter of the aperture 40 is less than the diameter of the studs.

To assemble the fire wall assembly 10, the sound barrier mat 22, with the absorber mat 16, is positioned with respect to the fire wall 12 so that the sound barrier mat apertures 26 align with the studs 14. The sound barrier mat 22 is mounted to the fire wall 12 so that the studs 14 extend through the sound barrier mat apertures 26. Once the sound barrier mat 22 is hung from the studs 14, each fastener 30 is mounted to its associated stud 14 by positioning the dome 36 above the stud 14 and pushing downwardly on the dome to force the stud 14 through to the cross-shaped aperture 40. The downward force of the dome deflects the flaps 42 a sufficient distance so that the stud 14 extends through the cross-shaped aperture 40 of the dome 36. The inherent resiliency of the flaps 42 presses the flaps 42 against the sides of the threaded stud 14 where the flaps engage the threads of the stud 14 to prevent the inadvertent removal of the dome 36.

Advantageously, because the fastener is integrally connected to the sound barrier mat 22 by the web 34, the fastener 32 is always within easy reach of the installer, permitting the simple and quick installation of the sound barrier mat. Also, there is no longer a need for the installer to keep a stockpile of separate fasteners, which can be dropped or misplaced during assembly.

Figure 5:
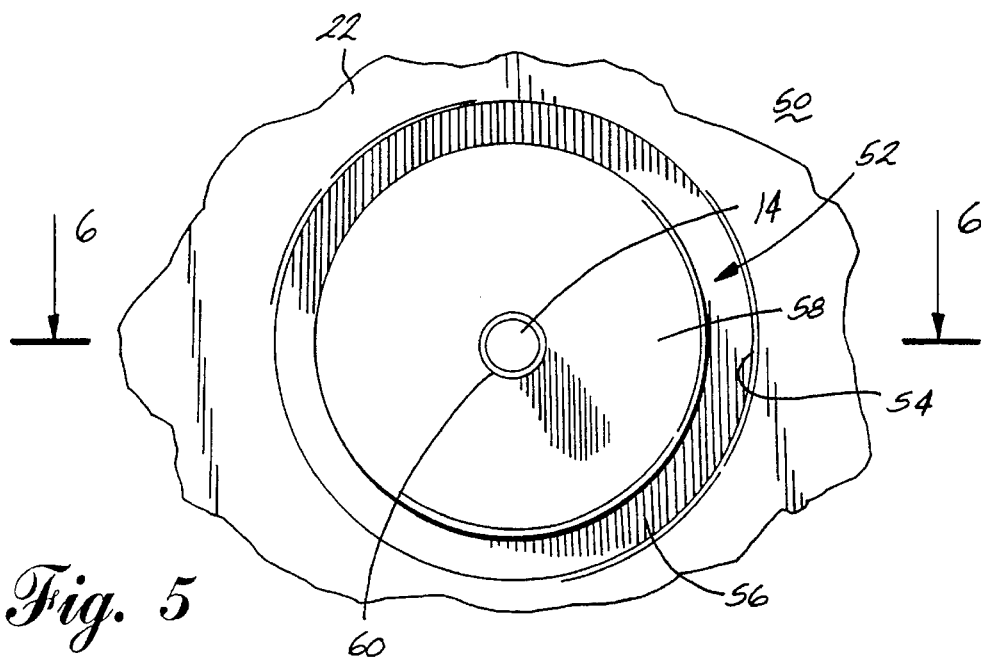
FIG. 5 is a plan view of a second embodiment of the integral fastener according to the invention.
Figure 6:
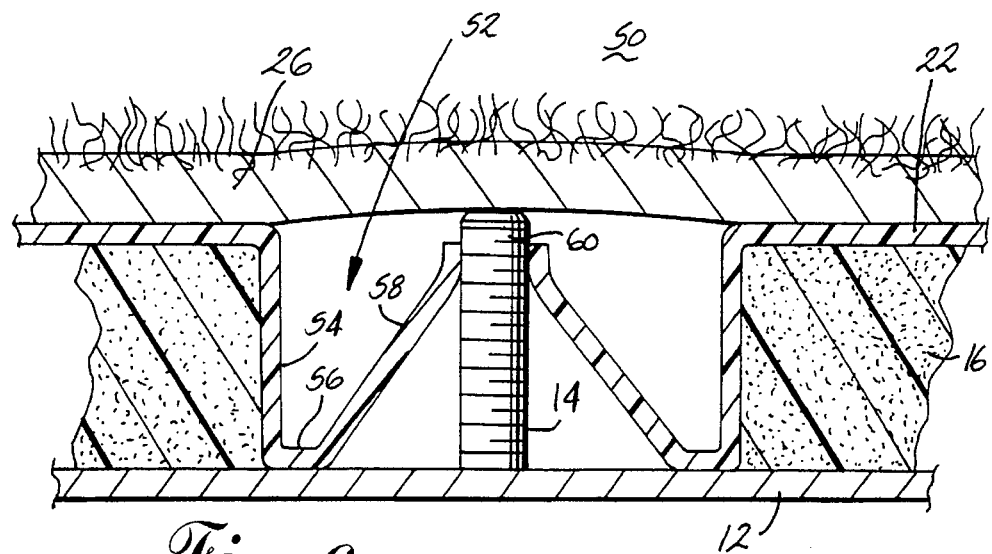
FIG. 6 is a sectional view taken along the line 6—6 in FIG. 5.

The integral fastener 30 is most suited for use on studs 14 positioned near the periphery of the sound barrier mat 22. However, in certain applications, it is desirable to locate the studs more interior of the periphery of the sound barrier mat 22. In those instances, the studs 14 can extend from an interior portion of the fire wall 12. FIGS. 5 and 6 illustrate a second embodiment of the integral fastener according to the invention, which is better suited for mounting the sound barrier mat 22 to a stud located interior of the periphery of the fire wall 12. In the description of the second embodiment, many of the elements are identical to the elements described in the first embodiment. Therefore, like parts are identified by like numerals.

The second embodiment of the integral or unitary fastener 50 comprises a cup-shaped depression 52 formed in the sound barrier mat 22. The cup-shaped depression 52 has an annular sidewall 54, which terminates in a bottom wall 56 from which extends a protrusion having a cone-shaped portion 58. The cone-shaped portion 58 is truncated at its upper end to form an aperture 60. Preferably, the diameter of the aperture 60 is slightly smaller than the diameter of the threaded stud 14 so that when the threaded stud is inserted through the aperture 60, the material forming the cone-shaped portion 58 is deformed to fasten the sound barrier mat 22 to the stud 14.

The fire wall assembly 10 is assembled using the integral fastener 50 in much the same manner as previously described with respect to the first embodiment of the integral fastener 30. The only substantive difference is that the aperture 60 of the cone-shaped portion 58 for the integral fastener 50 is aligned with a stud 14. Once aligned, the integral fastener 50 is pressed downwardly onto the stud 14 to force the threaded stud 14 through the aperture 60 of the cone-shaped portion, deforming the material comprising the cone-shaped portion and fastening the sound barrier mat 22 to the threaded stud 14.

Although the integral fastener 50 is better suited for mounting to studs positioned interiorly of the periphery of the fire wall as compared to the integral fastener 30, the integral fastener 50 is also suitable for mounting to the studs at the periphery of the fire wall. To mount to studs at the periphery of the fire wall, the integral fastener 50 need only be molded in the sound barrier mat at the periphery thereof. The second embodiment can also be used to improve the positioning of the sound barrier mat to the fire wall.

Figure 7:
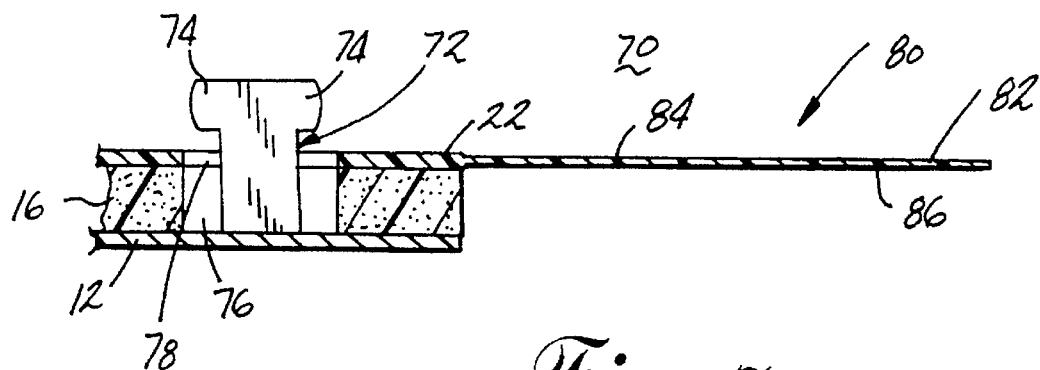
FIG. 7 is an elevational view in section of a third embodiment of the integral fastener according to the invention in a disassembled condition.
Figure 8:
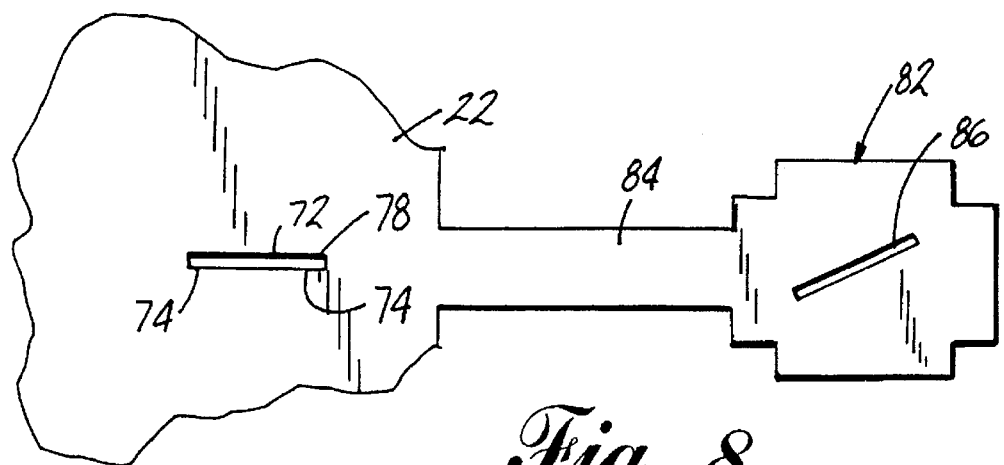
FIG. 8 is a plan view of the integral fastener in FIG. 7.
Figure 9:
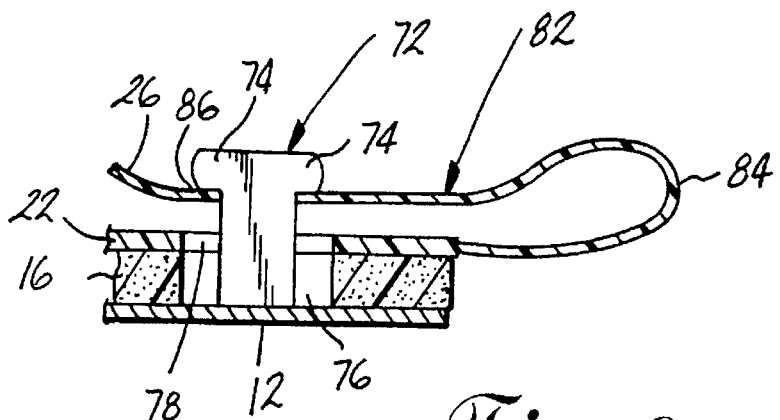
FIG. 9 is an elevational view in section of the integral fastener of FIG. 7 in the fastened position.

The first and second embodiments of the integral fastener mount to a threaded stud extending from the fire wall. However, in some applications it is desirable to use a flange or other similar planar element instead of the stud. FIGS. 7 through 9 illustrate a third embodiment of an integral fastener 80 specifically designed to mount to a support wall or box having flanges instead of studs. Many of the elements in the third embodiment are similar to the elements of the first and second embodiments. Therefore, like parts are identified by like numerals.

In the third embodiment, a wall 70 has upstanding studs or flanges 72 having a head formed by outwardly directed ears 74, providing the flange 72 with a T-shaped profile. The line connecting the ears 74 defines a transverse centerline.

The absorber mat 16 is mounted to the wall in the same manner as described above with respect to the first embodiment except that the apertures 18 are replaced by slots 76. Likewise, the sound barrier mat 22 has slots 78 adapted to receive the flange 72.

An integral or unitary fastener 80 is integrally molded with the sound barrier mat 22 and comprises a fastener 82 and a web 84 connecting the fastener to the sound barrier mat 22. The fastener 82 is substantially planar and has a retaining slot 86, which is oriented at an angle with respect to the traverse centerline of the flange 72.

In operation, the absorber mat 16 is mounted to the wall 70 by inserting the flange 72 through the slots 76 of the absorber mat 16. Likewise, to mount the sound barrier mat 22, the flanges 72 are inserted through the slots 78 of the sound barrier mat 22. The fastener 82 is then positioned over the flange 72. The fastener 82 is rotated so that the retaining slot 86 aligns with the transverse axes of the flange 72 and is pressed downwardly onto the flange 72 so that the ears 74 extend through the retaining slot 86. Upon release of the fastener 82, the inherent resiliency of the material comprising the integral fastener 80 applies a torque or twisting motion to the fastener 82 to rotate the retaining slot 86 with respect to the flange 72 so they are no longer aligned. In this position, it is difficult for the fastener 82 to be inadvertently removed from the flange 72.

All three embodiments of the integral fastener permit the quick and easy assembly of the fire wall assembly and the securing of the sound barrier mat to the fire wall. Unlike separate fasteners, the integral fastener according to the invention eliminates the stockpiling of separate fasteners and the slow down in assembly associated with the dropping or mishandling of the separate fastener.

While particular embodiments of the invention have been shown, it will be understood, of course, that the invention is not limited thereto since modifications may be made by those skilled in the art, particularly in light of the foregoing teachings. Reasonable variation and modification are possible within the scope of the foregoing disclosure of the invention without departing from the spirit of the invention.

I claim:

1. In a sheet material for mounting on a wall with a stud extending from the wall and through the sheet of material, a fastener formed with the sheet having an opening therethrough adapted to receive the stud and be retained securely thereon, and the improvement comprising:

the fastener being of unitary construction with the sheet and having a protrusion with the opening at a central portion of the protrusion.

2. A sheet material according to claim 1 wherein the protrusion has a hemispheric shape.

3. A sheet material according to claim 1 wherein the protrusion has a cone shape.

4. A sheet material according to claim 1 wherein the fastener opening is slotted and defines multiple flaps, which can be deformed as the stud is pushed through the fastener opening.

5. A sheet material according to claim 4 wherein the stud is threaded and the flaps are adapted to engage the threads of the stud to securely mount the protrusion to the stud.

6. A sheet material according to claim 4 wherein the portion of the dome forming the flaps is greater in thickness than the rest of the protrusion to stiffen the flaps.

7. A sheet material according to claim 1 wherein the protrusion has a hollow interior.

8. A sheet material according to claim 1 wherein the fastener is spaced from the sheet by a flexible web so that the fastener can be rotated to a position overlying the sheet.

9. In a sheet material for mounting on a wall with a stud extending from the wall, the sheet material having an aperture therethrough adapted to receive the stud; a fastener unitarily formed with the sheet and having an opening therethrough, the fastener adapted to overlie the sheet, receive the stud and be retained securely thereon to hold the sheet to the stud;

the improvement comprising:

a flexible, narrow web having a first end and a second end, the first end being unitarily formed with the sheet, the second end being unitarily formed with the fastener such that the fastener is spaced from the sheet aperture by the web, the fastener having a first surface facing outwardly when the fastener is spaced from the sheet, the fastener first surface facing inwardly when the fastener is rotated to a position overlying the sheet aperture, such that the fastener first surface faces the sheet when the aperture engages the stud.

10. A sheet material according to claim 9 wherein the fastener has a hemispheric shape, and the fastener first surface is concave.

11. A sheet material according to claim 9 wherein the fastener opening is slotted and defines multiple flaps, which can be deformed as the stud is pushed through the fastener opening.

12. A sheet material according to claim 9 wherein the fastener first surface defines a hollow interior.

13. A sheet material according to claim 9 wherein the aperture in the sheet is elongated and has a longitudinal axis, and the fastener opening is elongated and has a longitudinal axis which is oriented at an acute angle to the longitudinal axis of the sheet aperture such that a torque is applied to the fastener when the fastener is attached to the stud.

14. A structural wall assembly comprising:

a structural wall having at least one stud projecting therefrom;

a flexible sheet material mounted to the structural wall;

a fastener unitarily with the flexible sheet material and having an opening therethrough for receiving the stud to securely retain the sheet material to the structural wall; and the fastener having a cup-shaped depression extending downwardly from a surface of the flexible sheet material, and a protrusion extending upwardly from the cup-shaped depression with the opening at a central portion of the protrusion.

15. A structural wall assembly according to claim 14 wherein the protrusion has a hemispheric shape.

16. A structural wall assembly according to claim 14 wherein the protrusion has a cone shape.

17. A structural wall assembly according to claim 14 wherein the diameter of the fastener opening is smaller than the diameter of the stud, such that the fastener opening is deformed as the stud is pushed through the fastener opening.

18. A structural wall assembly according to claim 14 wherein the protrusion has a hollow interior.

19. A structural wall assembly comprising:

a structural wall having at least one stud projecting therefrom;

a sheet material having at least one aperture receiving the at least one stud to mount sheet material to the structural wall;

a fastener unitarily formed with the sheet material and having an opening therethrough receiving the stud and shaped to securely retain the fastener on the stud to thereby retain the sheet material on the structural wall; and the fastener being spaced from the at least one sheet aperture by a flexible web of unitarily construction with the sheet and fastener, the fastener having a first surface facing outwardly when the fastener is spaced from the sheet, the fastener first surface facing inwardly when the fastener is rotated to a position overlying the at least one sheet apertures, such that the fastener first surface faces the sheet when the aperture engages the stud.

20. A structural wall assembly according to claim 19 wherein the fastener has a hemispheric shape, and the fastener first surface is concave.

21. A structural wall assembly according to claim 19 wherein the fastener opening is slotted and defines multiple flaps, which can be deformed as the at least one stud is pushed through the fastener opening.

22. A structural wall assembly according to claim 19 wherein the fastener first surface defines a hollow interior.

23. A structural wall assembly according to claim 19 wherein the at least one aperture in the sheet is elongated and has a longitudinal axis, and the fastener opening is elongated and has a longitudinal axis which is oriented at an acute angle to the longitudinal axis of the at least one sheet apertures, such theft a torque is applied to the fastener when the fastener is attached to the stud.

24. A structural wall assembly according to claim 19 wherein the stud comprises an upstanding flange having laterally extending ears defining a plane and the fastener has a slot at an acute angle to the plane of the upstanding flange, such that s torque is applied to the fastener when the fastener is attached to the stud.

25. A method of assembling a sheet material with at least one aperture to a structural wall having at least one stud extending therefrom, the method comprising:

forming a fastener with the sheet material as a unitarily construction, the fastener having an opening for receiving the at least one stud and being shaped to securely grip the stud when received thereon;

mounting the sheet material to the structural wall by aligning the at least one aperture with the at least one stud and moving the sheet material toward the structural wall to insert the at least one stud through the at least one aperture; and securing the sheet material to the structural wall by aligning the fastener opening with the at least one stud and moving the fastener toward the structural wall to insert the at least one stud through the fastener opening.

26. The method according to claim 25 wherein the step of forming the fastener comprises the step of forming a web with the sheet material and fastener as a unitarily construction to connect the fastener to the sheet material and space the fastener from the at least one sheet aperture, and the step of securing the sheet material to the structural wall further comprises rotating the fastener so that it overlies the at least one sheet aperture.

27. A structural wall assembly according to claim 14, wherein the cup-shaped depression has an annular side wall and a bottom wall unitarily formed with the annular side wall, the protrusion being integral with and extending from the bottom wall.

28. A sheet material according to claim 1 wherein there are a plurality of said fasteners formed of unitarily construction in the sheet.

* * * * *

UNITED STATES PATENT AND TRADEMARK OFFICE
CERTIFICATE OF CORRECTION

PATENT NO. : 5,601,899

DATED : February 11, 1997

INVENTOR(S) : MICHAEL T. CAMPBELL

It is certified that error appears in the above-indentified patent and that said Letters Patent is hereby corrected as shown below:

<u>In the Specification</u>:

Column 2, line 6, "dome" should be --protrusion--.

<u>In the Claims</u>:

Claim 6, column 5, line 61, "dome" should be --protrusion--.
Claim 14, line 39, "unitarily" should be --unitary--.
Claim 19, column 7, line 4, "unitarily" should be --unitary--.
Claim 19, column 7, line 9, "apertures" should be --aperture--.
Claim 23, colunm 7, line 25, "apertures" should be --aperture-- and "theft" should be --that--.
Claim 24, column 7, line 31, "s" should be --a--.
Claim 25, column 8, line 1, "unitarily" should be --unitary--.
Claim 26, column 8, line 19, "unitarily" should be --unitary--.
Claim 27, column 8, line 29, "integral" should be --unitary--.
Claim 28, column 8, line 32, "unitarily" should be --unitary--.

Signed and Sealed this

Eighth Day of July, 1997

BRUCE LEHMAN

*Attest:*

*Attesting Officer*     *Commissioner of Patents and Trademarks*